(12) United States Patent
Deboy

(10) Patent No.: US 9,612,608 B2
(45) Date of Patent: Apr. 4, 2017

(54) MAXIMUM POWER POINT TRACKER BYPASS

(71) Applicant: Infineon Technologies Austria AG, Villach (AT)

(72) Inventor: Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 861 days.

(21) Appl. No.: 13/784,582

(22) Filed: Mar. 4, 2013

(65) Prior Publication Data

US 2013/0175883 A1    Jul. 11, 2013

Related U.S. Application Data

(63) Continuation of application No. 12/785,018, filed on May 21, 2010, now Pat. No. 8,390,261.

(51) Int. Cl.
*G05F 3/06* (2006.01)
*G05F 5/00* (2006.01)
(Continued)

(52) U.S. Cl.
CPC .............. *G05F 5/00* (2013.01); *G05F 1/67* (2013.01); *H02J 3/385* (2013.01); *H02M 2001/007* (2013.01); *Y02E 10/58* (2013.01)

(58) Field of Classification Search
CPC .. H02J 3/383; H02J 5/005; H02J 17/00; H02J 1/00; H02J 7/025; H02J 1/102; H02J 3/00; H02J 3/386; H02J 1/10; H02J 3/385; H02J 7/0055; H02J 7/35; H02J 1/08; H02J 3/38
(Continued)

(56) References Cited

U.S. PATENT DOCUMENTS 4,814,966 A * 3/1989 Ekstrand ................ G05F 1/648
                                                    323/233
5,867,011 A    2/1999 Jo et al.
(Continued)

FOREIGN PATENT DOCUMENTS

DE            102 19 956 A1     4/2003
DE    10 2005 020 937           11/2006
(Continued)

OTHER PUBLICATIONS

Enslin, J., et al., "Integrated Photovoltaic Maximum Power Point Tracking Converter," IEEE Transactions on Industrial Electronics, Dec. 1997, pp. 769-773, vol. 44, No. 6.
(Continued)

*Primary Examiner* — Jared Fureman
*Assistant Examiner* — Esayas Yeshaw
(74) *Attorney, Agent, or Firm* — Slater Matsil, LLP

(57) ABSTRACT

A circuit arrangement, includes output terminals that provide an output current and input terminals that receive a source current and a source voltage from a DC current source. A maximum power point tracker is coupled between the input terminals and the output terminals and a bypass circuit is coupled between the input terminals and the output terminals. The bypass circuit is configured to enter a bypass state dependent on the output current and dependent on the source current. The source current flows through the bypass circuit in the bypass state.

29 Claims, 7 Drawing Sheets

(51) Int. Cl.
*G05F 1/67* (2006.01)
*H02J 3/38* (2006.01)
*H02M 1/00* (2006.01)

(58) Field of Classification Search
USPC ........................................................ 307/151
See application file for complete search history.

(56) References Cited

U.S. PATENT DOCUMENTS

| | | | |
|---|---|---|---|
| 6,111,767 A * | 8/2000 | Handleman | G05F 1/67 |
| | | | 136/293 |
| 6,262,558 B1 | 7/2001 | Weinberg | |
| 6,433,522 B1 | 8/2002 | Siri | |
| 6,844,739 B2 * | 1/2005 | Kasai | G05F 1/67 |
| | | | 323/284 |
| 6,984,970 B2 | 1/2006 | Capel | |
| 7,969,133 B2 | 6/2011 | Zhang et al. | |
| 8,184,460 B2 | 5/2012 | O'Brien et al. | |
| 8,379,361 B2 * | 2/2013 | Bleus | H02H 3/025 |
| | | | 361/58 |
| 8,629,647 B2 * | 1/2014 | Bhat | H02J 7/0029 |
| | | | 320/101 |
| 8,786,139 B2 * | 7/2014 | Cummings | H01L 31/02021 |
| | | | 307/151 |
| 2011/0316346 A1 * | 12/2011 | Porter | G05F 1/67 |
| | | | 307/82 |

FOREIGN PATENT DOCUMENTS

| | | |
|---|---|---|
| DE | 10 2008 042 199 A1 | 4/2010 |
| DE | 10 2009 051 186 | 5/2010 |
| WO | WO 2009/049717 | 4/2009 |

OTHER PUBLICATIONS

Calais, M., et al., "Inverters for Single-Phase Grid Connected Photovoltaic Systems—An Overview," IEEE, 2002, pp. 1995-2000.
Walker, G., et al., "Cascaded DC-DC Converter Connection of Photovoltaic Modules," IEEE Transactions on Power Electronics, Jul. 2004, pp. 1130-1139, vol. 19, No. 4.
González, R., et al., "Transformerless Inverter for Single-Phase Photovoltaic Systems," IEEE Transactions on Power Electronics, Mar. 2007, pp. 693-697, vol. 22, No. 2.
Lee, J. P., et al., "A Novel Topology for Photovoltaic DC/DC Full-Bridge Converter with Flat Efficiency Under Wide PV Module Voltage and Load Range," IEEE Transactions on Industrial Electronics, Jul. 2008, pp. 2655-2663, vol. 55, No. 7.

* cited by examiner

MAXIMUM POWER POINT TRACKER BYPASS

This is a continuation application of U.S. application Ser. No. 12/785,018, filed on May 21, 2010, entitled Maximum Power Point Tracker Bypass, and is incorporated herein by reference.

TECHNICAL FIELD

Embodiments of the present invention relate to a circuit arrangement with a maximum power point tracker.

BACKGROUND

With an increasing interest in sustainable energy production there is a focus on using photovoltaic arrays for producing electric power. Photovoltaic (PV) arrays include at least one photovoltaic (PV) cell, which is also known as a solar cell. Since the output voltage of one cell is relatively low, a PV array usually includes a string with a plurality of series connected solar cells or even several such strings connected in parallel.

As it is known, a solar cell, and thus a PV array, acts like a power generator providing a DC output voltage and a DC output current when it is exposed to sunlight. For a given light power received by the PV array there is a range of output currents and a range of corresponding output voltages at which the PV array can be operated. However, there is only one output current and one corresponding output voltage at which the electric power provided by the PV array has its maximum. The output current and the output voltage at which the output power assumes its maximum define the maximum power point (MPP). The MPP varies dependent on the light power received by the array and dependent on the temperature.

Maximum power point trackers (MPPT) are circuits that detect the maximum power point of a PV array and operate the PV array in its MPP independent on the voltage or current requirements of a load that is supplied by the PV array.

For providing higher output voltages a plurality of PV modules, with each module including a PV array and an MPPT, can be connected in series. In such a system with a plurality of series connected modules the MPPT in each module provides for the operation of the corresponding PV array in its MPP. An MPPT usually includes a switched-mode converter. A switched-mode converter includes at least one switch, like a transistor, that is operated at high switching frequencies, which are usually in the range of at least several kHz. Inevitably, the switching operations result in switching losses in the MPPT.

There is, therefore, a need for a circuit arrangement with a maximum power point tracking capability and with low losses.

SUMMARY OF THE INVENTION

A first aspect relates to a circuit arrangement with output terminals, configured for providing an output current. Input terminals are configured for receiving a source current and a source voltage from a DC current source. A maximum power point tracker is connected between the DC current source and the output terminals, and a bypass circuit is coupled between the input terminals and the output terminals. The bypass circuit is configured to enter a bypass state dependent on the output current and dependent on the source current, wherein in the bypass state the source current flows through the bypass circuit.

A second aspect relates to a circuit arrangement with output terminals, configured for providing an output current and an output voltage. Input terminals are configured for receiving a source current and a source voltage. A maximum power point tracker includes a DC-DC converter connected between the input terminals and the output terminals. The DC-DC converter includes at least one switch. The circuit arrangement further includes a bypass circuit coupled to the DC-DC converter and configured to enter a bypass state dependent on the output current and dependent on the source current. In the bypass state, the bypass circuit permanently sets a switching state of the at least one switch such that the source current is allowed to pass the DC-DC converter.

Third and fourth aspects relate to a circuit arrangement with one of the above mentioned circuit arrangements and with a DC current source connected to the input terminals. According to an embodiment the DC current source is a PV panel with at least one solar cell.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like signals and circuit components.

FIG. 4, which includes

DETAILED DESCRIPTION OF ILLUSTRATIVE EMBODIMENTS

Figure 1:
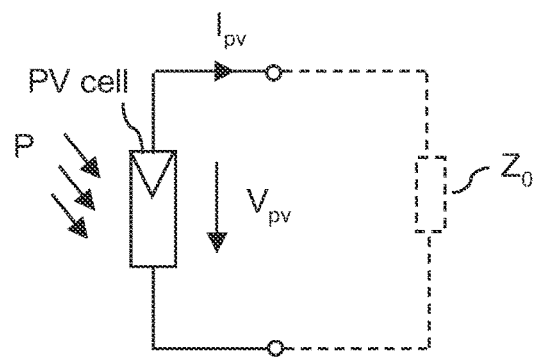
FIG. 1 schematically illustrates a solar cell.

For a better understanding of the present invention and its implementation principles FIG. 1 schematically illustrates a photovoltaic (PV) cell, that is also known as solar cell, as an example of a DC current source. The PV cell when exposed to solar irradiation provides an output current, that is also referred to as photo current $I_{PV}$, at an output voltage or photo voltage $V_{PV}$. The electric power provided by the PV cell is the product of the photo current $I_{PV}$ and the photo voltage $V_{PV}$. This electric power can be used for supplying an electric load $Z_0$ (illustrated in dashed lines).

Figure 2A:
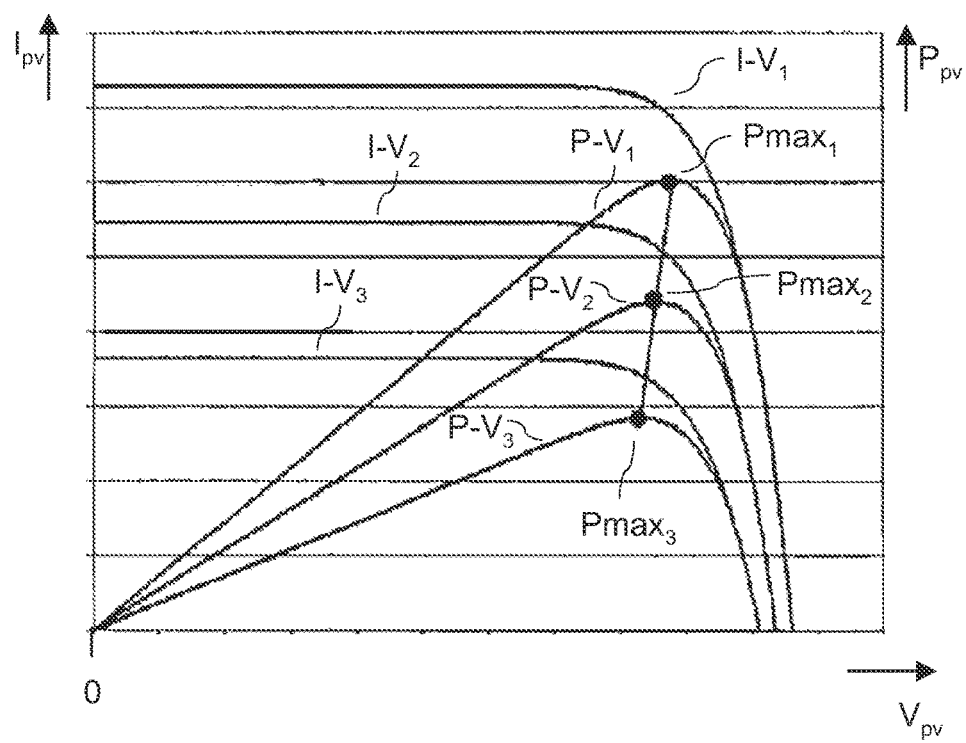
FIG. 2A illustrates the characteristic curve of a solar cell and its output power dependent on the output voltage for different solar irradiation powers.

FIG. 2A schematically illustrates a characteristic curve of a solar cell for different irradiation powers. A characteristic curve illustrates the photo current $I_{PV}$ dependent on the photo voltage $V_{PV}$. In FIG. 2A three different characteristic curves I-$V_1$, I-$V_2$, I-$V_3$ are illustrated. For a given output voltage the photo current $I_{PV}$ increases with increasing irradiation power. As it can be seen from the characteristic curves illustrated in FIG. 2A the photo current $I_{PV}$ is approximately constant for voltages lower than a threshold voltage, wherein for voltages higher than the threshold voltage the photo current rapidly decreases. For solar cells made of silicon the threshold voltage is about 0.6V.

FIG. 2A further illustrates the output power $P_{pv}$ of the solar cell dependent on the output voltage $V_{PV}$ for different irradiation powers. The output power $P_{PV}$ increases with increasing irradiation power. In FIG. 2A curves P-$V_1$, P-$V_2$, P-$V_3$ illustrating the output power are shown for three different irradiation powers. Each of these curves has a maximum $Pmax_1$, $Pmax_2$, $Pmax_3$, respectively.

Figure 2B:
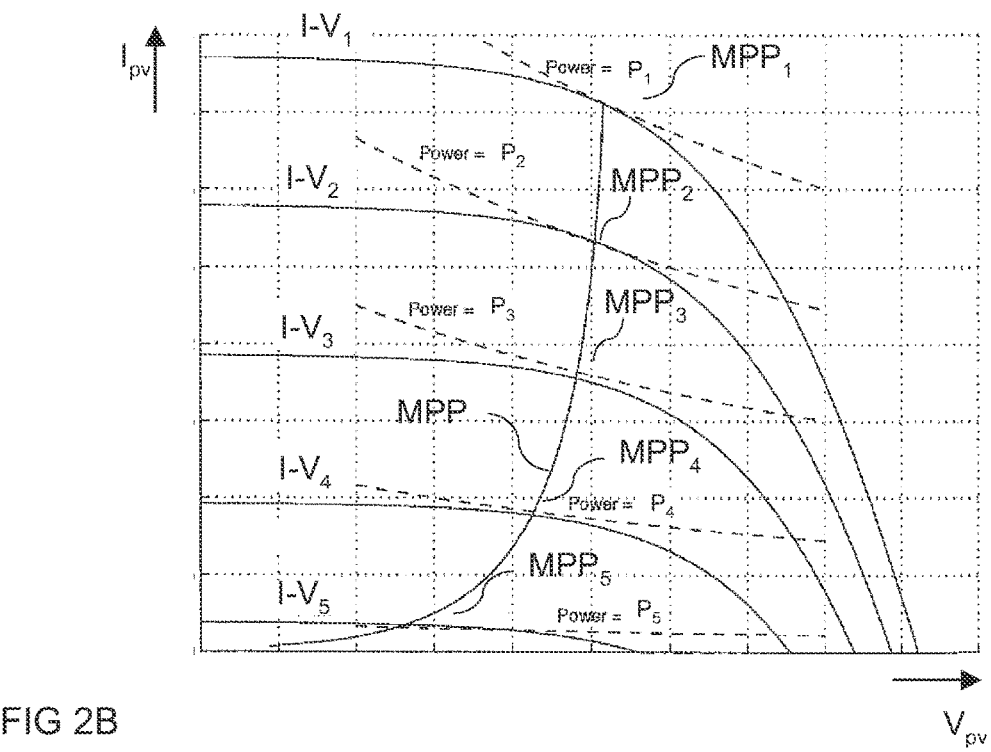
FIG. 2B illustrates the locus of the maximum power point (MPP) on the characteristic curves.

What makes the operation of solar cells and, thus, the operation of photovoltaic arrays with a plurality of solar cells difficult, is the fact that for different irradiation powers the maximum output power is obtained for different output voltages $V_{pv}$ and for different output currents $I_{pv}$. To illustrate this, FIG. 2B illustrates a number of characteristic curves I-$V_1$ to I-$V_5$ obtained for different irradiation powers and the points on each of these characteristic curves at which the maximum output power is obtained. These points, that are referred to as maximum power points (MPP), are defined by a unique pair with an output current and the corresponding output voltage. In the characteristic curves I-$V_1$ to I-$V_5$ of FIG. 2B the maximum power points are designated as $MPP_1$ to $MPP_5$. Curve MPP in FIG. 2B illustrates the maximum power points. It can be seen that the photo current $I_{pv}$ and the output voltage $V_{pv}$ at the maximum power points increases with increasing irradiation power. Summarizing the above, for each irradiation power there is a unique output current $I_{pv}$ and output voltage $V_{pv}$ pair at which the output power $P_{pv}$ has its maximum.

In order to maximize the electric power provided by a PV cell or a PV array a maximum power point tracker (MPPT) can be used. An MPPT provides a load to the PV cell or the PV array such that the PV cell or the PC array is operated in its MPP or close to its MPP. However, power losses may occur in the MPPT during its operation.

Figure 3:
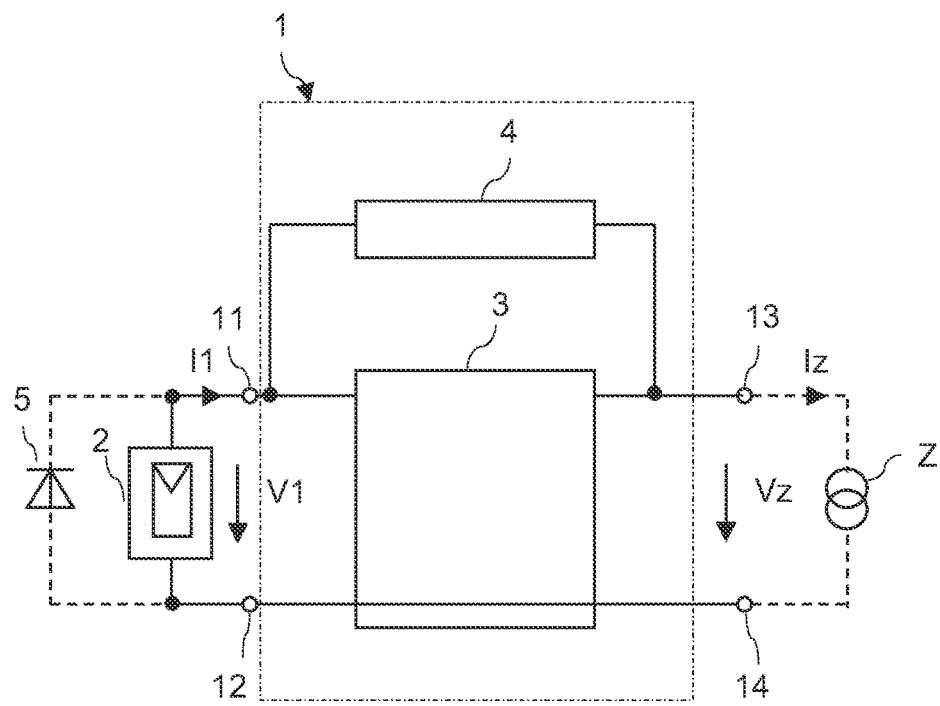
FIG. 3 illustrates a first embodiment of a circuit arrangement with a maximum power point tracker (MPPT) and a bypass circuit and with a photovoltaic (PV) panel connected to the circuit arrangement.

FIG. 3 illustrates a first embodiment of a circuit arrangement that is configured to operate a DC current source, such as a PV array 2, in its MPP or close to its MPP and that has reduced losses. The circuit arrangement 1 includes input terminals 11, 12 for receiving an input current I1 and an input voltage V1 from a DC current source, such as PV array 2.

Figures 4A, 4B, 4C:
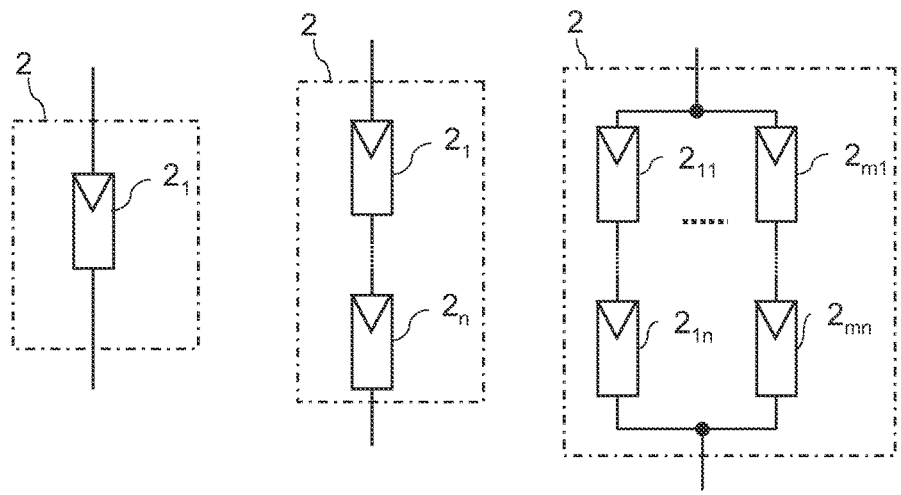
FIGS. 4A-4C, illustrates embodiments of the PV panel.

PV array 2, that will also be referred to as PV panel in the following includes at least one solar cell and can include a plurality of solar cells. FIG. 4A illustrates an embodiment of a PV array 2 with one solar cell $2_1$ connected between output terminals of the PV array 2.

FIG. 4B illustrates an embodiment in which the PV panel 2 includes a string of n, with n≥2, solar cells $2_1$, $2_n$ connected in series. Such cell string provides a higher output voltage than only one cell.

According to a further embodiment, which is illustrated in FIG. 4C, PV panel 2 includes a plurality of m, with m≥2, strings, wherein each string includes n solar cells $2_{11}$, $2_{1n}$, $2_{m1}$, $2_{mn}$ connected in series. According to an embodiment n=16 and m=3.

Referring to FIG. 3, the circuit arrangement 1 further includes output terminals 13, 14 for providing an output current Iz to a load Z (illustrated in dashed lines). Load Z may be any load that is configured to draw a load current Iz from the module that includes the circuit arrangement 1 and a PV panel 2 connected to the circuit arrangement 1. Load Z may include a DC-AC converter that converts a DC power provided at the output terminals 13, 14 of the circuit arrangement 1 into an AC power. Load Z may also include additional PV panels that are connected in series with each other and in series with the circuit arrangement 1.

The circuit arrangement 1 includes an MPPT 3 connected between the input terminals 11, 12 and the output terminals 13, 14. MPPT 3 may be a usual MPPT that is configured to operate the PV panel 2 connected to the input terminals 11, 12 in its MPP. MPPTs are commonly known, so that further explanations are not required in this regard. The circuit arrangement 1 further includes a bypass circuit 4 coupled between the input terminals 11, 12 and the output terminals 13, 14. The bypass circuit 4 is configured to enter a bypass state dependent on the source current I1 and dependent on the output current Iz. When the bypass circuit 4 is in its bypass state the source current I1 flows through the bypass circuit 4, thereby at least partly bypassing the MPPT 3. "At least partly bypassing" in this connection means that the source current I1 either completely bypasses the MPPT 3 or bypasses at least those circuit components of the MPPT 3 that in operation of the MPPT 3 cause the highest losses, such as switching elements. Bypass circuit 4 is configured to have lower power losses than the MPPT 3.

When bypass circuit 4 is not in its bypass state MPPT 3 operates the PV panel 2 in its MPP. "Operating the PV panel 2 in its MPP" means that MPPT 3 draws a source current I1 from PV panel 2 such that PV panel 2 is operated in its MPP. When the source current I1 equals the load current Iz, than it is safe to assume that MPPT 3 is currently not required, because the current Iz drawn by the load Z would also operate PV panel 2 in its MPP. Thus, according to one embodiment the bypass circuit 4 is configured to enter the bypass state when the source current I1 deviates less than a given value from the output current Iz. According to one embodiment the bypass circuit enters the bypass state when the absolute value of a difference between the output current Iz and the source current I1 is less than 10% of the output current, or less than 5% of the output current.

Bypassing the MPPT 3 under those operating conditions under which the MPPT 3 is not needed, helps to increase the overall efficiency of a system including a PV panel 2 and a MPPT 3. The bypass circuit 4 is configured to leave the bypass state when a maximum power point tracking condition is met, i.e. when there is the need to again track the MPP using the MPPT 3.

According to one embodiment a bypass element 5, such as a diode, is connected in parallel with the PV panel 2. In case the MPPT 3 is bypassed and the PV panel 2 is not capable of providing the load current Iz drawn at the output terminals 13, 14 load current Iz causes a current to flow through the bypass diode 5. According to one embodiment bypass circuit 4 evaluates a current through the bypass diode 5 and leaves the bypass state when a current through the bypass diode 5 is higher than a given threshold value. According to one embodiment the threshold is zero, wherein in this case the bypass circuit 4 leaves the bypass state as soon as a current flows through the bypass diode 5.

Assuming that PV panel 2 is not capable of providing the required output current Iz and that the load Z, which may include additional current generators, such as further PV panels, forces the output current Iz to flow through the PV panel 2 when the MPPT 3 is bypassed. In this case PV panel 2 does not act as a generator anymore but acts as a load itself. The source voltage V1 then changes its polarity from the positive polarity illustrated in FIG. 3 to a negative polarity. This is also true when a bypass diode, such as bypass diode 5, is connected in parallel with the PV panel 2, where in this case the load current flows through the bypass diode 5 instead of the PV panel 2. The change of the polarity of the source voltage V1 can be used to detect the maximum power point tracking condition. According to one embodiment bypass circuit 4 evaluates the polarity of the source voltage V1 and leaves the bypass state when the source voltage V1 changes has a polarity that indicates that PV panel 2 is operated under load conditions instead of generator conditions.

Figure 5:
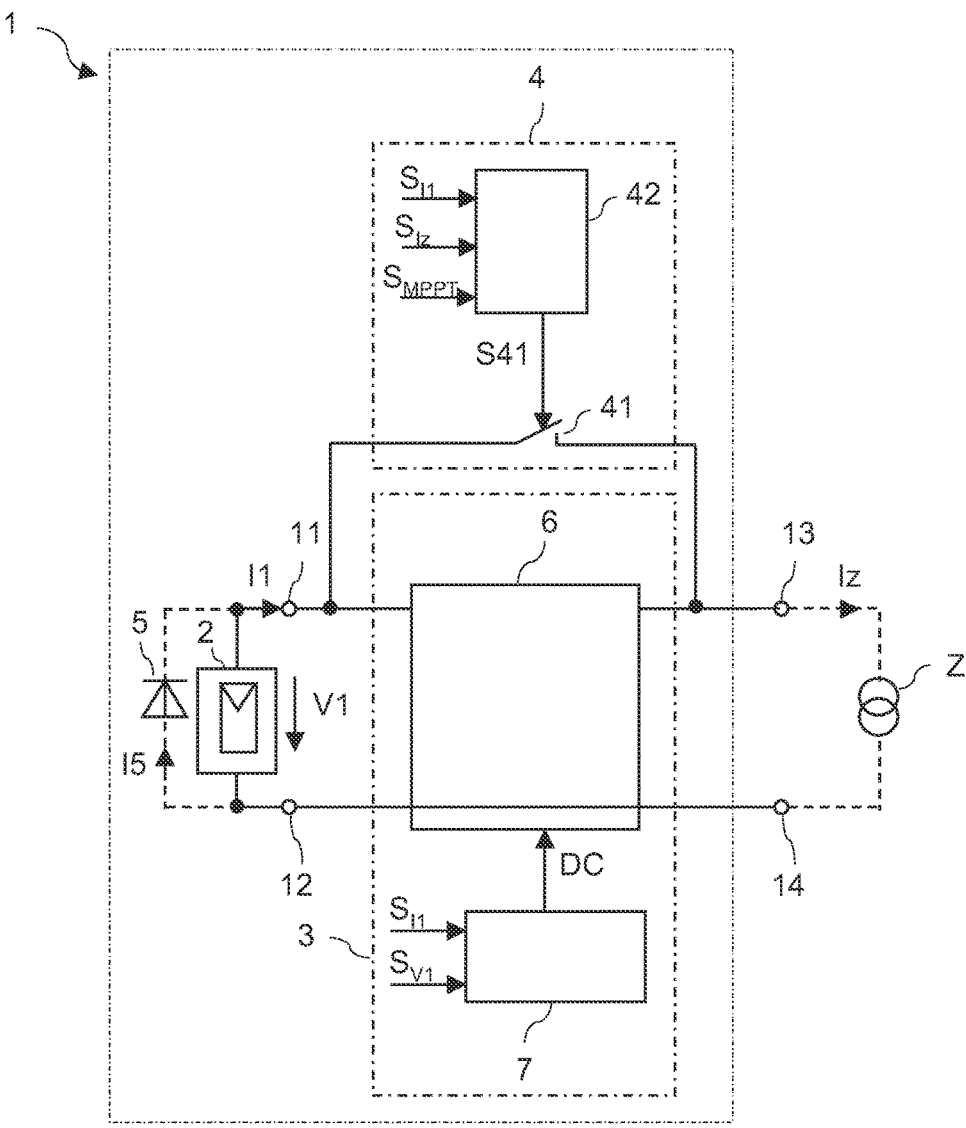
FIG. 5 illustrates an MPPT with an MPP detector and a DC-DC converter and a bypass circuit with a switching element and a drive circuit for the switch.

FIG. 5 illustrates an embodiment of the bypass circuit 4 in greater detail. According to this embodiment, bypass circuit 4 includes a switching element 41 connected between one 11 of the input terminals and one 13 of the output terminals. Switching element 41 is driven in an on-state or an off-state dependent on a drive signal S41 provided by a control circuit 42.

Figure 6:
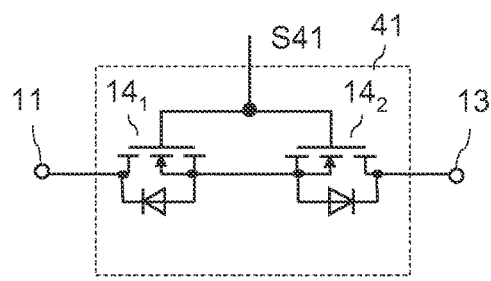
FIG. 6 illustrates an embodiment of a switching element which is implemented with two MOSFET.

Switching element 41 may be implemented as a transistor, such as a MOSFET. Referring to a further embodiment illustrated in FIG. 6, switching element 41 is implemented using two MOSFETs $14_1$, $14_2$ that have their load paths (drain-source paths) connected in series between one 11 of the input terminals and one 13 of the output terminals. The two MOSFETs $14_1$, $14_2$ have their source terminals connected with each other and have their gate terminals connected with each other. The MOSFETs $14_1$, $14_2$ are controlled by the drive signal S41 received at the gate terminals. The drive signal S41 switches the two MOSFETs $14_1$, $14_2$ commonly on or off. MOSFETs usually have an integrated diode (body diode) between source and drain. Such diodes are also illustrated in FIG. 6. Due to this diode an n-MOSFET in its off-state is only capable of blocking a positive drain-source voltage, while it conducts when applying a negative drain-source voltage (a positive source-drain voltage). A p-MOSFET in its off-state is only capable of blocking a negative drain-source voltage, while it conducts when applying a positive drain-source voltage. A switching element that includes two MOSFETs connected in series, such as the switching element 41 illustrated in FIG. 6, is capable of blocking voltages with both polarities when it is in its off state, i.e., it is capable of blocking a positive voltage applied between the input 11 and the output 13 terminal, and it is capable of blocking a negative voltage applied between the input 11 and the output 13 terminal.

Bypass circuit 4 is in its bypass state when switching element 41 is switched on, i.e. when switching element 41 is driven in its on-state. Switching element 41 is driven in its on-state by the control circuit 42 dependent on the source current I1 and the output current Iz. For this purpose control circuit 42 receives a source current signal $S_{I1}$ that represents the source current I1, and an output current signal $S_{Iz}$ that represents the output current Iz. These signals $S_{I1}$, $S_{Iz}$ are provided by current measurement circuits (not illustrated). Such current measurement circuits are generally known, so that no further explanations are required in this regard. These current measurement circuits may include shunt resistors, Hall-elements, etc.

Control circuit 42 further receives a maximum power point tracking signal $S_{MPPT}$ indicating whether the maximum power point tracking condition is met. Referring to the explanation hereinabove, maximum power point tracking signal $S_{MPPT}$ may either represent a current 15 flowing through bypass diode 5, or the source voltage V1.

The MPPT 3 includes a DC-DC converter 6 connected between the input terminals 11, 12 and the output terminals 13, 14 and a MPP detector 7 that controls the DC-DC converter 6. The DC-DC converter 6 includes at least one switching element (not illustrated in FIG. 5) that in operation of the DC-DC converter 6 is switched on and off in a pulsewidth-modulated manner. By varying a duty-cycle of the pulsewidth-modulated driving of the switching element the current drawn by the DC-DC converter at the input terminals 11, 12 and, thus, the source current I1 can be adjusted. The MPP detector 7 that provides a duty-cycle information DC to the DC-DC converter 6. DC-DC converter 6 adjusts its duty-cycle dependent on the duty-cycle information DC in order to adjust the source current I1 and the source voltage V1 such that PV panel 2 is operated in its MPP. According to one embodiment MPP detector 7 receives a source current signal $S_{I1}$ that represents the source current I1 and a source voltage information $S_{V1}$ that represents the source voltage V1. From these input signals $S_{I1}$, $S_{V1}$ MPP detector 7 calculates the instantaneous output power of the PV panel 2 and adjusts the duty-cycle of the DC-DC converter 6 such that this output power is maximized. A plurality of commonly known algorithms may be used in the MPP detector 7 to find the MPP and to adjust the duty-cycle accordingly. According to one embodiment the MPP detector 7 varies the duty-cycle of the DC-DC converter 6 within a given duty-cycle range, measures the output power for each of these duty-cycles and, finally, adjusts the duty-cycle to that value for which the maximum output power has been detected. MPP detector 7 may be adapted to periodically check if the instantaneous operation point of the PV panel 2 is still the MPP or whether the MPP has changed.

Providing a source current I1 information and a source voltage V1 information to the MPP detector 7 is only one example. According to a further embodiment MPP detector 7 receives an output current Iz and an output voltage Vz information and adjusts the duty-cycle of the DC-DC converter 6 such that the output power of the circuit arrangement 1 is maximized, wherein the output power is defined by the product of the output current Iz and the output voltage Vz. However, any other algorithms for detecting the MPP of a PV panel 2 and for adjusting a duty-cycle of a DC-DC converter, such as DC-DC converter 6, such that the PV panel 2 is operated in its MPP could be used as well.

Figure 7:
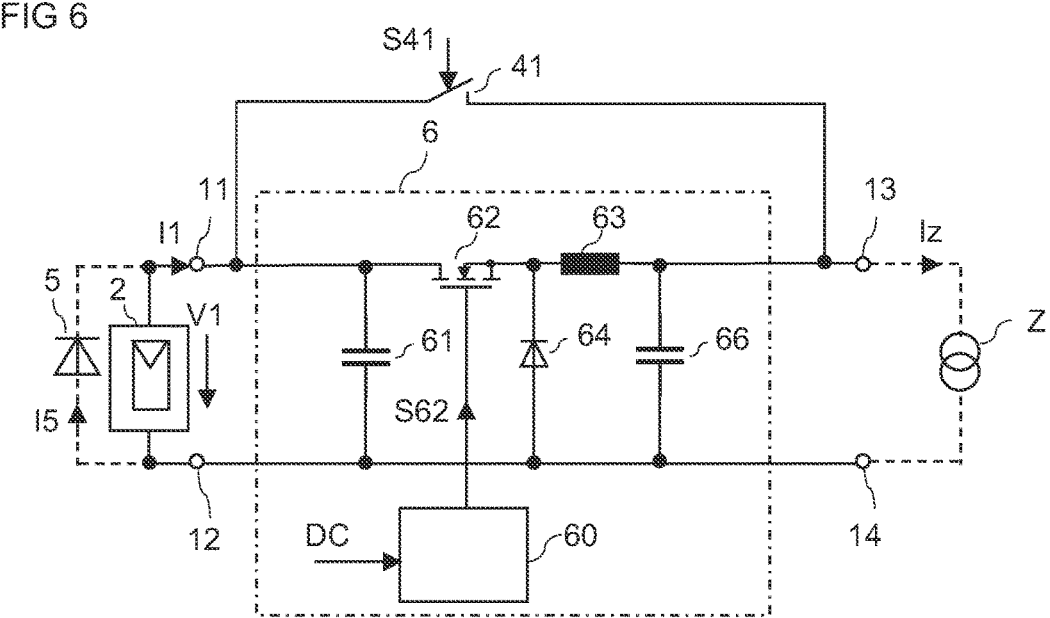
FIG. 7 illustrates a first embodiment of the bypass circuit and an embodiment of the MPPT in which the DC-DC converter is a buck converter.

FIG. 7 illustrates an embodiment of a DC-DC converter 6 that is implemented as a buck converter. This converter includes an input capacitive storage element 61, such as a capacitor, connected between the input terminals 11, 12. Further, a series circuit with a switching element 62 and first inductive storage element 63, such as a choke, is connected between one of the input terminals 11, 12 and one of the output terminals 13, 14. In the embodiment illustrated in FIG. 6 this series circuit is connected between the first input terminal 11 and the first output terminal 13. However, this is only an example. This series circuit could also be connected between the second input terminal 12 and the second output terminal 14. A freewheeling element 64 is connected between the first inductive storage element 63 and the second output terminal 14. Optionally, an output capacitive storage element 66, such as a capacitor, is connected between the output terminals 13, 14.

Figure 8:
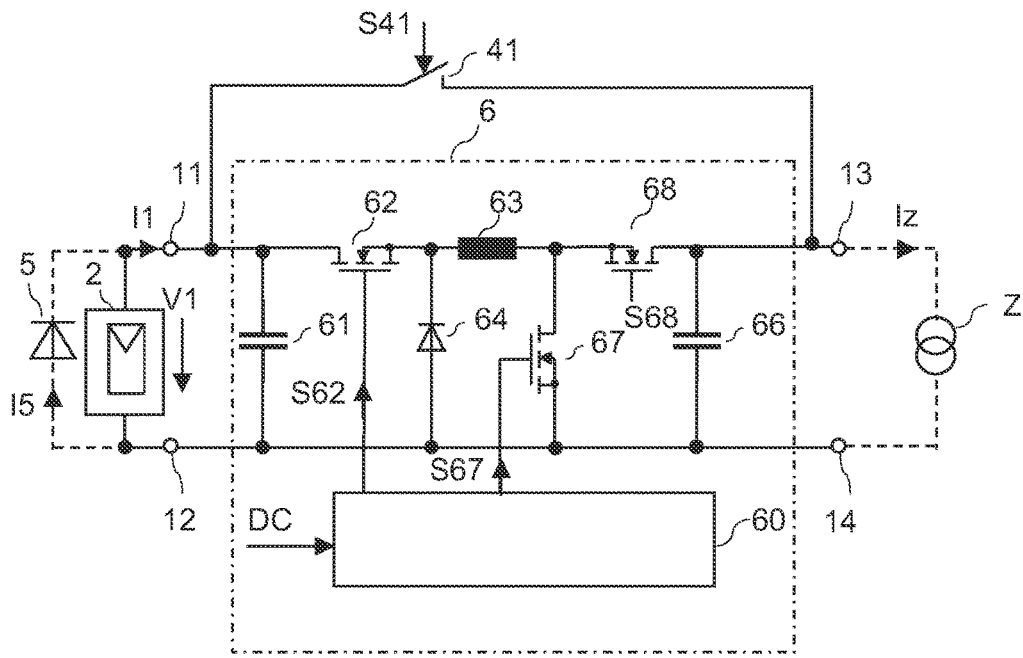
FIG. 8 illustrates an embodiment of the MPPT in which the DC-DC converter is a buck-boost converter.

Switching element 62 is, for example, a transistor, such as a MOSFET (as illustrated). The switching element 62 is driven by a pulse width-modulated drive signal S62 provided by a drive circuit 60. Drive circuit 60 receives the duty-cycle information DC from the MPP detector (not illustrated in FIG. 6) and generates the pulse width-modulated drive signal S62 dependent on the duty-cycle information. The operating principle of the DC-DC converter 6 according to FIG. 6 will now be explained. When switching element 62 is closed a current flows from the PV panel 2 into the input capacitor 61 and, thus, charges input capacitor 61. When switching element 62 is closed the source current I1 and a current from the input capacitor 61 flow through the switching element 62 and the inductive storage element 63 connected in series with the switching element 62 to the output terminals 13, 14. When the switching element 62 is closed, a freewheeling element 64 allows a current to flow through the first inductive storage element 63 that has been magnetized during the previous on-cycle of the switching element 62. Freewheeling element 64 can be implemented as a diode (as illustrated), but could also be implemented as any other suitable rectifying element, such as a synchronous rectifier, which is a rectifier implemented with a transistor, such as a MOSFET. An embodiment of such synchronous rectifier is illustrated in FIG. 8 hereinbelow.

The DC-DC converter 6, such as the buck converter illustrated in FIG. 7 as well as the converters that will be explained hereinbelow, acts as a current sink that draws a mean current I1 which is defined by the MPP detector 7 from the PV panel. The DC-DC converter 6 is operated in continuous current mode (CCM). Thus, unless the DC-DC converter 6 is bypassed, the mean value of a current flowing through the converter 6 does not decrease to zero. The current flowing into the DC-DC converter 6 cyclically increases and decreases, wherein in the buck converter of FIG. 6, the current increases when the switching element 62 is switched on and decreases when the switching element 62 is switched off. The mean value of the current drawn by the DC-DC converter 6 is adjusted through the duty cycle of the switching element 62 by MPP detector 7. To increase the mean value of the current I1 drawn from the PV panel 2 the MPP detector 7 temporarily increases the duty cycle until the desired current I1 is reached, and to decrease the mean value of the current I1 drawn from the PV panel 2, the MPP detector 7 temporarily decreases the duty cycle until the desired current I1 is reached. The "duty-cycle" is defined by the ratio between a time Ton when the switching element 62 is switched on during one switching period and a duration T of the switching period, whereas T includes the on-time Ton and an off-time Toff of the switching element 62.

The current I1 the DC-DC converter 6 draws from the PV panel 2 is adjusted by the MPP detector 7 through the duty cycle of the DC-DC converter 6. The output current Iz drawn at the output of the DC-DC converter is defined by the load connected to the DC-DC converter 6. With a defined input current I1 of the DC-DC converter 6 the input voltage V1 automatically adjusts according to the characteristic curve of the PV panel 2, and with a defined output current Iz the output voltage Vz automatically adjusts so that the output power, which is the product of the output voltage Vz and the output current Iz, equals the input power, which is the product of the input voltage V1 and the input current I1, minus switching losses in the DC-DC converter 6.

In FIG. 7 the switching element 41 of the bypass circuit is also illustrated. In this embodiment the switching element 41 is connected between the first input terminal 11 and the first output terminal 13 and, so that when the bypass circuit 4 is in the bypass state the source current bypasses the switching element 62 and the first inductive storage element 63 of the DC-DC converter 6. The source current I1, that equals the load current Iz in this case, only flows through the PV panel 2 and the switching element 41 when the bypass circuit is in its bypass state.

FIG. 8 illustrates an embodiment in which the DC-DC converter 6 is implemented as a buck-boost converter. The topology of this converter corresponds to the topology of the buck that has been explained with reference to FIG. 6 hereinabove, wherein additionally a rectifier element 68 is connected between the first inductive storage element 63 and the output capacitor 66, and a second switching element 67 is connected between the inductive storage element 63 and the second output terminal 14. This converter can be operated either in a buck-mode or in a boost-mode.

In the buck-mode the second switching element 67 is permanently switched off (open) and the first switching element 62 is switched on and off in a pulsewidth-modulated manner. The converter in this case operates like the buck converter that has been explained with reference to FIG. 6 hereinabove.

In the boost-mode the first switching element 62 is permanently switched on (closed), and the second switching element 67 is switched on and off in a pulsewidth-modulated manner. When the second switching element 67 is switched on the inductive storage element 63 is magnetized and, therefore, stores energy. When the second switching element 67 is switched off, the inductive storage element 63 is demagnetized and, therefore, provides energy to the output capacitor 66 and/or the load Z via rectifier element 68. Rectifier element 68 can be implemented as a diode (not illustrated). However, in the example illustrated, rectifier element 68 is implemented as a synchronous rectifier. The rectifier includes a MOSFET that is switched on and off by the drive circuit 60 through a drive signal S68. The drive circuit 60 switches the MOSFET of the rectifier 68 on each time the second switching element 67 is switched off, so that a current can flow from the inductive storage element to the output capacitor.

Drive signals S62, S67 for the first and second switching element 62, 67 are provided by drive circuit 60 dependent on the duty cycle information DC and dependent on a mode information MOD. Mode information MOD is also provided by the MPP detector 7 (not illustrated in FIG. 8). The mode information MOD determines whether the buck-boost converter is to be operated in its buck-mode or in its boost-mode. The duty-cycle information DC determines the duty-cycle of that switch that is operated in a pulse width-modulated fashion in the respective mode, which is the first switching element 62 in the buck-mode and the second switching element 67 in the boost-mode.

Figure 9:
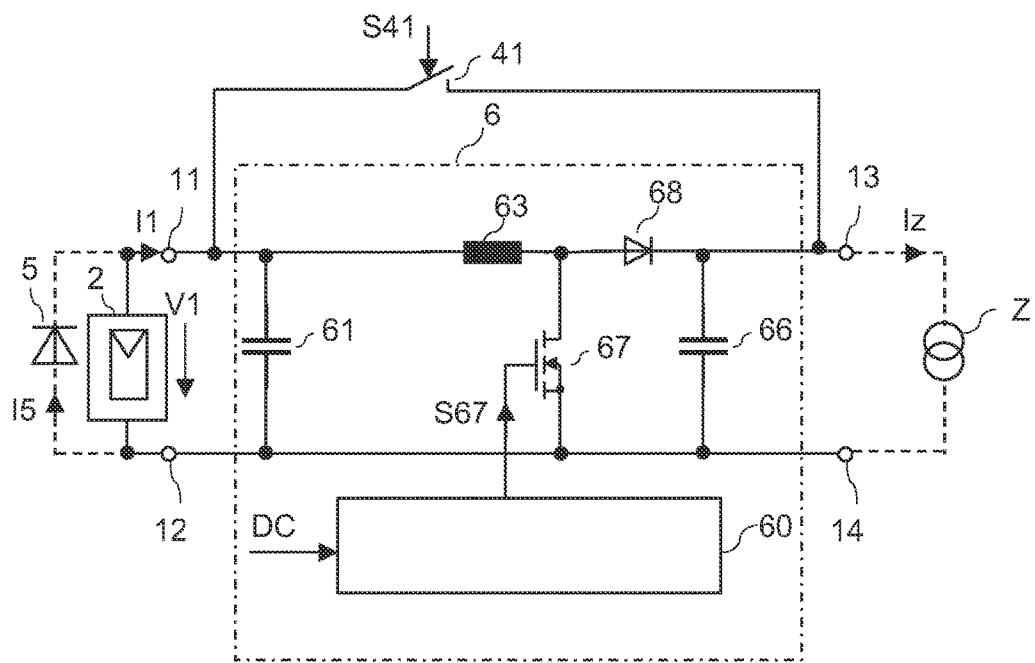
FIG. 9 illustrates a first embodiment of the MPPT in which the DC-DC converter is a boost converter.

FIG. 9 illustrates a further embodiment of the DC-DC converter. According to FIG. 9, the DC-DC converter is implemented as a boost converter. Such a boost converter results from the buck-boost converter illustrated in FIG. 8 by leaving out the first switching element 62 and freewheeling element 64. The operation principle of the boost converter corresponds to the operation principle of the buck-boost converter in the boost-mode, which has been explained with reference to FIG. 8 hereinabove.

Figure 10:
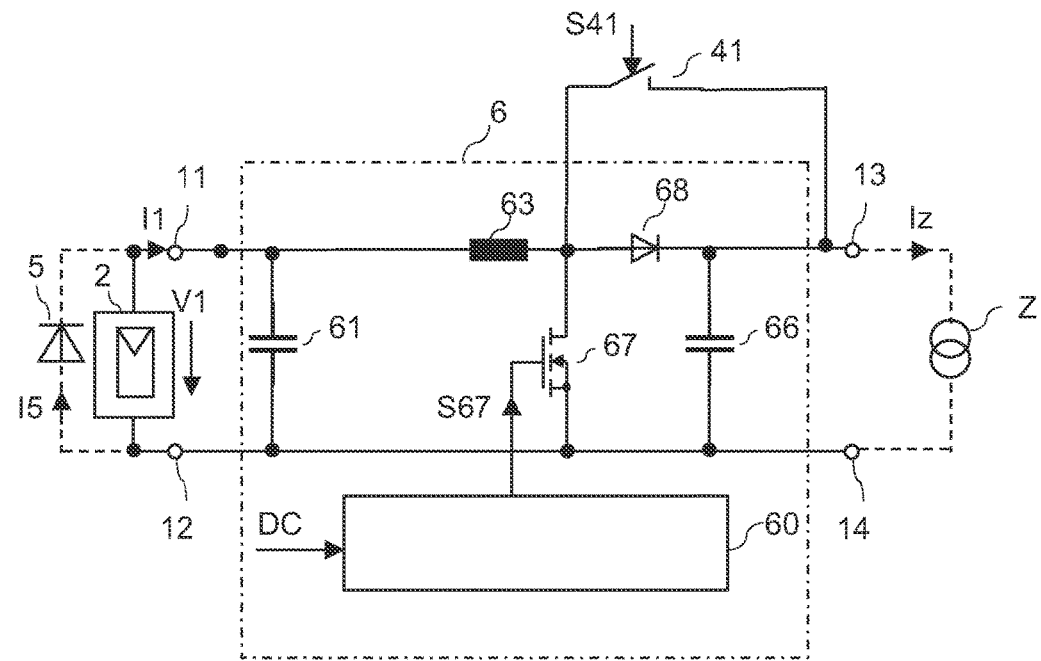
FIG. 10 illustrates a second embodiment of the MPPT in which the DC-DC converter is a boost converter.

According to a further embodiment that is illustrated in FIG. 10, the switching element 41 of the bypass circuit only bridges the further rectifier element 68 of the DC-DC converter 6. In this case the source current I1 always flows through the inductive storage element 63 independent of whether the bypass circuit 4 is in its bypass state.

It goes without saying that besides a buck converter, a boost converter, or a buck-boost converter, any other type of switched-mode converter, such as a boost-buck converter (not illustrated) may be used as well.

The basic idea of providing a bypass circuit, such as bypass circuit 4 with a switching element 41 illustrated in FIGS. 5 to 9, is to avoid switching losses that occur in the DC-DC converter of the MPPT 3 in those cases in which MPPT 3 is not required to operate PV panel 2 in its MPP, because the load current Iz drawn by the load Z anyway causes PV panel 2 to be operated in its MPP. Switching losses in the DC-DC converter of the MPPT 3 occur with every switching cycle of the at least one switch implemented in the DC-DC converter. The switching element 41 of the bypass circuit 4 illustrated in FIGS. 5 to 9 physically bridges MPPT 3 completely or at least bridges the switching element of MPPT 3, thus causing the source current I1 to physically bypass the MPPT 3 or to at least bypass its switching element.

Figure 11:
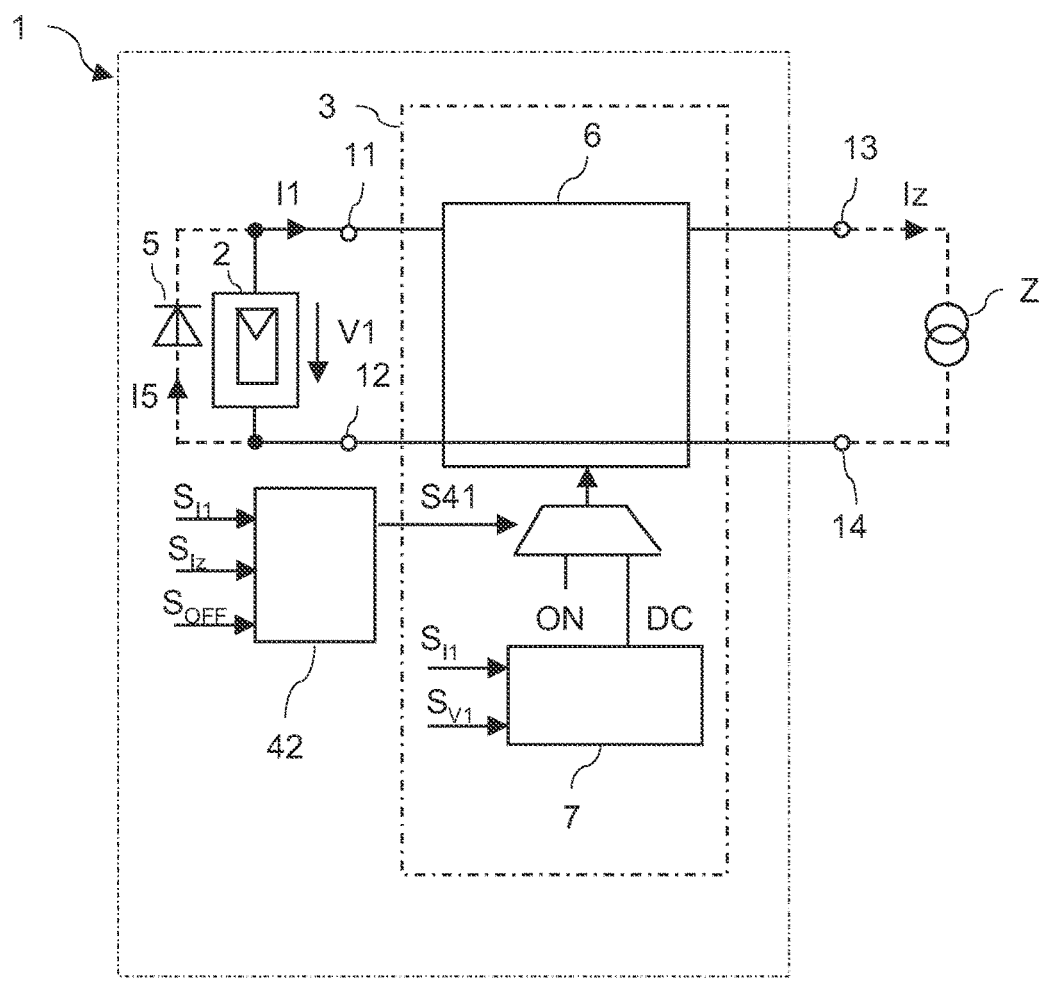
FIG. 11 illustrates a second embodiment of a circuit arrangement with a maximum power point tracker (MPPT) and a bypass circuit.

According to a further embodiment illustrated in FIG. 11 bypass circuit 4 does not include a switching element for physically bypassing the MPPT 3. In this circuit arrangement bypass circuit 4 in the bypass state causes the DC-DC converter 6 of the MPPT 3 to operate the at least one switching element such that the source current I1 permanently flows through the DC-DC converter 6. This corresponds to a "virtual bypass" of the MPPT 3. In a buck converter, such as the buck converter illustrated in FIG. 6, the switching element 62 is permanently switched on, i.e. has a duty cycle of 100%, for virtually bypassing the MPPT. In a buck-boost converter, such as the buck-boost converter illustrated in FIG. 8 the first switching element 62 is permanently switched on, i.e. has a duty-cycle of 100%, and the second switching element 67 is permanently switched off, i.e. has a duty-cycle of 0%, for virtually bypassing the MPPT. And in a boost converter, such as the boost converter illustrated in FIG. 9, the switching element 67 is permanently switched off, i.e. has a duty-cycle of 0%, for virtually bypassing the MPPT.

The DC-DC converter 6 in this embodiment has two operation modes: A first, normal operation mode in which the at least one switching element of the DC-DC converter is switched on and off dependent on a duty-cycle information DC provided by the MPP detector 7; and a second operation mode in which the MPPT is virtually bypassed by setting the duty-cycle of the at least one switching element to 100% or 0%, depending on the type of DC-DC converter. The DC-DC converter 6 is operated in its second operation mode when the bypass circuit 4 is in its bypass state.

Bypass circuit 4 includes a control circuit 42 that generates a control signal. Such control signal is generated in the same manner as the drive signal S41 for switching element 41 illustrated in FIG. 5. However, in the embodiment of FIG. 10 the output signal of the control circuit 42 does not control a switching element, but controls the duty-cycle of the DC-DC converter 6. When the control signal represents a bypass state of the bypass circuit 4 DC-DC converter 6 receives a duty-cycle information 0/100 that permanently sets a duty-cycle of its at least one switching element to 0% or 100%, respectively. When the bypass circuit 4 is not in the bypass state DC-DC converter 6 receives a duty-cycle information that corresponds to the duty-cycle information provided by the MPP detector 7. In FIG. 10 a multiplexer, dependent on a control signal of the bypass circuit 4, switches between these two different duty-cycle information. However, use of a multiplexer is only an example. A switching between different duty-cycle information could be performed in any suitable manner.

Using a switching element, such as switching element 41, for bypassing the MPPT 3 has the advantage, that a switching element can be used that has an extremely low on-resistance, wherein a high-frequency switching capability is not required. Virtually bypassing the MPPT 3 has the advantage that no additional switching element is required. However, switching elements used in DC-DC converters usually have a high-frequency switching capability and, thus, usually have a higher on-resistance.

Figure 12:
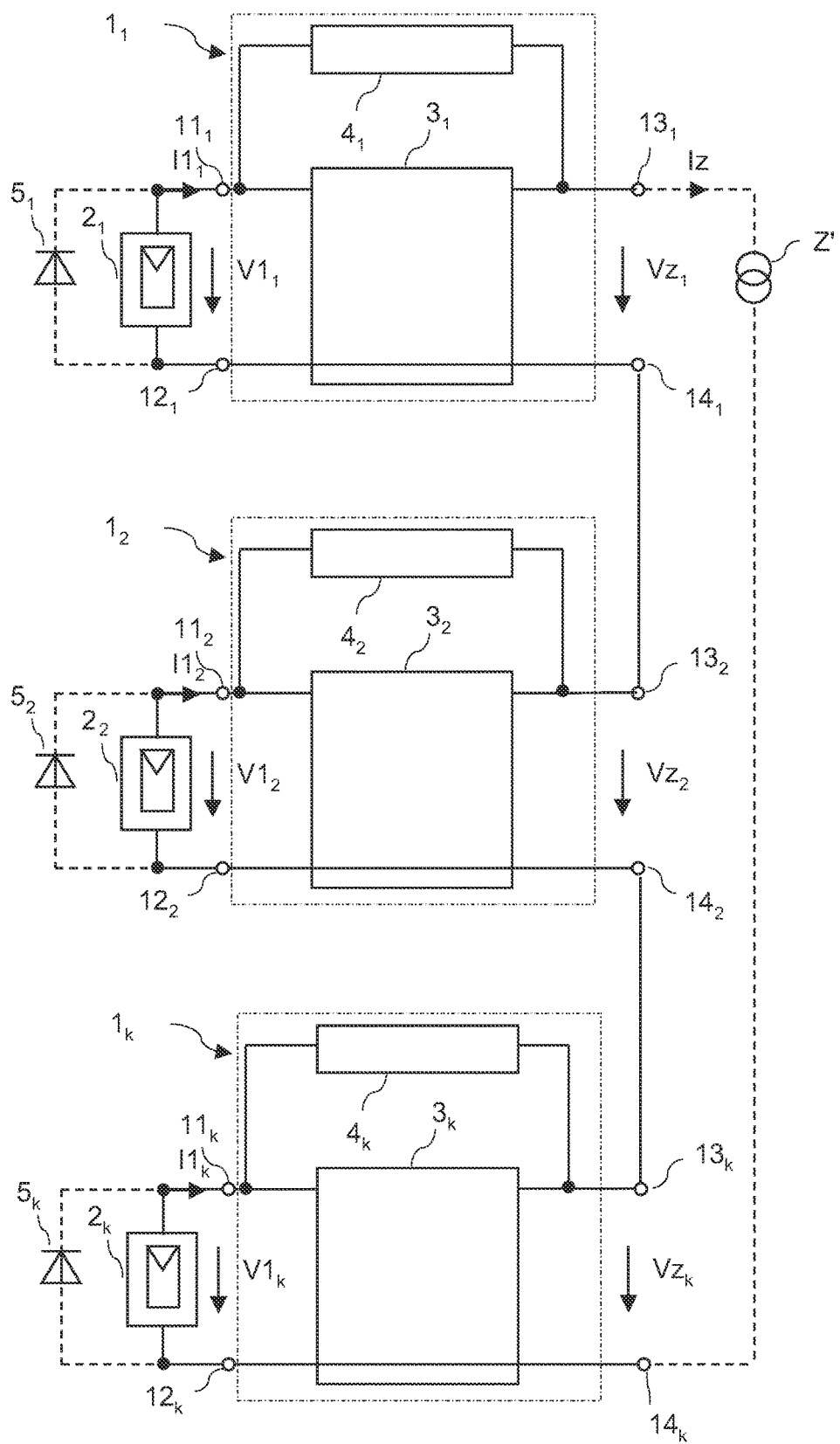
FIG. 12 illustrates a system with a plurality of modules connected in series, with each module including a circuit arrangement with an MPPT and a bypass circuit.

Referring to FIG. 12 a plurality of k modules with a PV panel $2_1$, $2_2$, $2_k$ and with a circuit arrangement $1_1$, $1_2$, $1_k$ including an MPPT $3_1$, $3_2$, $3_k$ and a bypass circuit $4_1$, $4_2$, $4_k$ can be cascaded or connected in series with each other by connecting a first output terminal of one module with a second output terminal of another module. In FIG. 12 a system with k=3 cascaded modules is illustrated. This system can be used for supplying a load Z', wherein such load may include a DC-AC converter with an additional MPPT. The current Iz drawn from the system is determined by the load Z'. Due to the series connection of the individual modules, the output currents of the modules are identical. In case these output currents correspond to the source currents $I1_1$, $I1_2$, $I1_k$ of the individual PV panels $2_1$, $2_2$, $2_k$ the MPPTs of the individual modules are physically or virtually bypassed. There may be situations in which some modules in their MPP provide a current as required by the load, while other modules in their MPP provide a lower current. This could be the case when modules are shaded. In this case the MPPTs of some modules could be bypassed, thereby avoiding switching losses in the MPPTs, while MPPTs of other modules are active.

What is claimed is:

1. A method comprising:
   providing an output current at output terminals by each of a plurality of modules, wherein the output terminals of the plurality of modules are connected in series, wherein each of the plurality of modules is a power module;
   receiving a module source current and a module source voltage from a DC current source at input terminals by each of the plurality of modules; and
   entering a bypass state by at least one of the plurality of modules dependent on the output current and dependent on the module source current of the at least one of the plurality of modules, wherein, in the bypass state, the module source current flows through a bypass circuit coupled between the input terminals and the output terminals of the at least one of the plurality of modules.

2. The method of claim 1, wherein the entering the bypass state comprises entering the bypass state when the source current deviates less than a given value from the output current.

3. The method of claim 2, wherein the entering the bypass state further comprises entering the bypass state when an absolute value of a difference between the output current and the source current is less than 10% of the output current.

4. The method of claim 2, wherein the entering the bypass state further comprises entering the bypass state when an absolute value of a difference between the output current and the module source current is less than 3% of the output current.

5. The method of claim 1, further comprising the bypass circuit leaving the bypass state when a maximum power point tracking condition is met.

6. The method of claim 5, further comprising:
evaluating a current through a bypass element coupled in parallel with the DC current source; and
the maximum power tracking condition is met when a current through the bypass element is higher than a given threshold value.

7. The method of claim 6, wherein the given threshold value is zero.

8. The method of claim 5, further comprising evaluating the module source voltage via the bypass circuit, wherein the maximum power point tracking condition is met when the module source voltage has a given polarity.

9. The method of claim 8, wherein the given polarity is a polarity indicating that the DC current source acts as a load.

10. The method of claim 1, further comprising
converting a DC signal using a DC-DC converter connected between the DC current source and the output terminals and having a control terminal coupled to receive a duty cycle signal and at least one switch;
evaluating an output power of the DC current source using a maximum power point detector; and
providing the duty cycle signal using the maximum power point detector.

11. The method of claim 10, wherein the using the DC-DC converter comprises using a converter selected from the group consisting of a buck converter, a boost converter, and a buck-boost converter.

12. The method of claim 10, further comprising bypassing at least one switch in the bypass state using the bypass circuit.

13. A method comprising:
providing an output current at output terminals by each of a plurality of modules, wherein each of the plurality of modules comprises input terminals, output terminals, a DC-DC converter coupled between the input terminals and the output terminals, and a bypass circuit coupled to the DC-DC converter, wherein the output terminals of the plurality of modules are connected in series, and wherein each of the plurality of modules is a power module;
receiving a module source current and a module source voltage at the input terminals of the by each of the plurality of modules;
entering a bypass state by a bypass circuit of at least one of the plurality of modules, wherein the entering the bypass state by the bypass circuit of the at least one of the plurality of modules is dependent on the output current and is dependent on the module source current of the at least one of the plurality of modules; and
wherein entering the bypass state by the bypass circuit of the at least one of the plurality of modules comprises permanently setting a switching state of a switch of the DC-DC converter in the at least one of the plurality of modules such that the module source current is allowed to permanently pass the DC-DC converter, wherein permanently setting the switching state of the switch is performed by the bypass circuit.

14. The method of claim 13, wherein the entering the bypass state comprises entering the bypass state when the source current deviates less than a given value from the output current.

15. The method of claim 13, further comprising the bypass circuit leaving the bypass state when a maximum power point tracking condition is met.

16. The method of claim 13, further comprising:
evaluating a power at the input terminals;
providing a duty cycle signal to the DC-DC converter; and
driving the switch of the DC-DC converter dependent on the duty cycle signal.

17. A method comprising:
providing an output current at output terminals by each of a plurality of modules, wherein each of the plurality of modules comprises input terminals, output terminals, and a bypass circuit coupled between the input terminals and the output terminals, wherein the output terminals of the plurality of modules are connected in series, and wherein each of the plurality of modules is a power module; and
entering a bypass state by at least one of the plurality of modules dependent on the output current and dependent on a source current of a DC current source, wherein, in the bypass state, the source current flows through the bypass circuit of the at least one of the plurality of modules.

18. The method of claim 17, wherein the DC current source includes a photovoltaic array with at least one solar cell.

19. A method comprising:
providing an output current at output terminals by each of a plurality of modules, wherein each of the plurality of modules comprises input terminals, output terminals, a DC-DC converter coupled between the input terminals and the output terminals, and a bypass circuit coupled to the DC-DC converter, wherein the output terminals of the plurality of modules are connected in series, wherein each of the plurality of modules is a power module;
receiving a module source current and a module source voltage at input terminals by each of the plurality of modules; and
entering a bypass state by a bypass circuit of at least one of the plurality of modules, wherein the entering the bypass state is dependent on an output current of a DC current source and is dependent on a source current, and
wherein entering the bypass state by the bypass circuit of the at least one of the plurality of modules comprises permanently setting a switching state of a switch of the DC-DC converter such that the source current is allowed to permanently pass the DC-DC converter, and wherein the permanently setting the switching state of the switch is performed by the bypass circuit.

20. The method of claim 19, wherein the DC current source includes a photovoltaic array with at least one solar cell.

21. A circuit arrangement, comprising:
a plurality of modules, each module comprising:
output terminals that provide an output current;
input terminals that receive a source current and a source voltage from a DC current source; and
a bypass circuit coupled between the input terminals and the output terminals, the bypass circuit entering a bypass state dependent on the output current and dependent on the source current, wherein the source current flows through the bypass circuit in the bypass state, wherein the output terminals of the plurality of modules are connected in series.

22. The circuit arrangement of claim 21, wherein the bypass circuit enters the bypass state when the source current deviates less than a given value from the output current.

23. The circuit arrangement of claim 22, wherein the bypass circuit enters the bypass state when an absolute value of a difference between the output current and the source current is less than 10% of the output current.

24. The circuit arrangement of claim 22, wherein the bypass circuit enters the bypass state when an absolute value of a difference between the output current and the source current is less than 3% of the output current.

25. The circuit arrangement of claim 21, wherein the bypass circuit, when in the bypass state, leaves the bypass state when a maximum power point tracking condition is met.

26. The circuit arrangement of claim 25, further comprising a bypass element coupled in parallel with the DC current source, wherein the bypass circuit is configured to evaluate a current through the bypass element, and wherein the maximum power point tracking condition is met when a current through the bypass element is higher than a given threshold value.

27. The circuit arrangement of claim 26, wherein the given threshold value is zero.

28. The circuit arrangement of claim 25, wherein the bypass circuit evaluates the source voltage, and wherein the maximum power point tracking condition is met when the source voltage has a given polarity.

29. The circuit arrangement of claim 28, wherein the given polarity is a polarity indicating that the DC current source acts as a load.

* * * * *